United States Patent Office 2,899,461
Patented Aug. 11, 1959

2,899,461

PREPARATION OF ALKALI METAL ISETHIONATES

Robert Martin Smith, Odessa, Tex., assignor to The Dow Chemical Company, Midland, Mich., a corporation of Delaware No Drawing. Application September 13, 1957
Serial No. 683,686

4 Claims. (Cl. 260—513)

This invention concerns the preparation of alkali metal salts of isethionic acid.

The preparation of isethionic acid as its potassium or sodium salt from ethylene oxide and potassium or sodium bisulfite using high pressure equipment is known.

It has now been discovered, in accordance with this invention, that alkali metal salts of isethionic acid can be prepared by reacting at least an equimolar proportion of ethylene sulfite and an alkali metal carbonate or bicarbonate at a temperature between 90° and 170° C., preferably betweeen 140° and 160° C. for a time sufficient to form the desired product, generally ranging between ½ and 5 hours, preferably between 2 and 3 hours. Below 140° C., the reaction proceeds relatively slowly. Above 160° C., the product tends to become increasingly more discolored. A slight excess of ethylene sulfite is preferred, since the equilibrium is shifted to the right by excess ethylene sulfite. However, good yields of isethionic acid salts are obtained when equimolar proportions of ethylene sulfite and an alkali metal carbonate or bicarbonate are reacted. Sodium carbonate and sodium bicarbonate are preferred for economic reasons.

The reaction is represented by the following equation

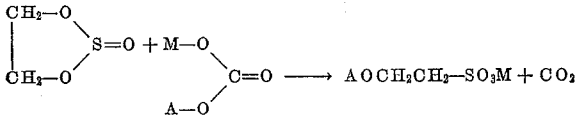

wherein M represents an alkali metal and A is either an alkali metal or hydrogen.

The advantages of this method over the prior art are (1) high pressure equipment is not required, since ethylene sulfite has a low vapor pressure, as compared with ethylene oxide, (2) handling and shipping of ethylene sulfite is less hazardous than that of ethylene oxide and (3) anhydrous products may be produced.

In practice, the reaction can be carried out with the reactants in a slurry with an inert volatile liquid organic medium preferably boiling between about 100° and 180° C., in the absence of an added reaction medium or in aqueous solution. When the aqueous solution method is used, the reactants are dissolved in water, heated to reaction temperature, preferably under reflux, and reacted for a time sufficient to form the isethonic acid salt. The reaction is followed by measuring the weight loss or carbon dioxide evolution. The aqueous medium is then evaporated, advantageously in an oven at 100° C. and preferably under a partial vacuum. Solid product is thereby recovered. In the slurry process, the reactants are heated to reaction temperature in an inert volatile liquid organic medium such as in an aromatic hydrocarbon, advantageously under reflux, for a time sufficient to form the alkali metal isethionate. The product salt is separated by filtration and dried. The reactants may also be mixed together in the absence of an added reaction medium, heated to reaction temperature for a time sufficient to form the desired product, and anhydrous alkali metal isethionate product thereby obtained. The free acid is liberated and recovered from its salts in known manner by acidification with a mineral acid.

The following examples show ways in which the invention has been practiced.

Example 1

Into a three-necked flask equipped with a stirrer, a reflux condenser and a thermometer were placed 108 g. (1 mole) of ethylene sulfite and 84 g. (1 mole) of sodium bicarbonate. The reactants were stirred and heated at approximately 150° C. for two hours. A lumpy product resulted, the conversion being 93 percent and the yield being 84 percent sodium isethionate, as determined by sulfur analysis. Infrared analysis showed that the product contained between 80 and 90 percent of sodium isethionate and no sodium sulfate. The free isethionic acid is liberated by acidification with a mineral acid.

Example 2

One mole (108 g.) of ethylene sulfite and one mole (286 g.) of sodium carbonate decahydrate were dissolved in 150 ml. of water contained in a three-necked flask equipped with a stirrer, a reflux condenser and a thermometer. The mixture was stirred and heated at 90° C. for two hours. Excess water was then evaporated from the resultant product in a vacuum oven at 100° C. and 4–5 mm. Infrared analysis showed 40 to 60 percent of sodium isethionate and an appreciable amount of sodium sulfate in the product.

Example 3

Into a two-necked flask equipped with a reflux condenser and a thermometer were placed 54 g. (0.5 mole) of ethylene sulfite, 42 g. (0.5 mole) of sodium bicarbonate and 100 ml. of xylene. The slurried mixture was heated at 130° to 140° C. for three hours. The product was separated from the reaction medium by filtration, and absorbed xylene was evaporated off. Sulfur and inorganic sulfite analysis indicated a conversion of 63 percent and a yield of sodium isethionate of about 81 percent.

Example 4

A quantity of 42 g. (0.5 mole) of sodium bicarbonate and 116 g. (1.07 mole) of ethylene sulfite was heated together at 140° C. for 1 hour with stirring under a reflux condenser. A white solid product was formed while 18 g. was lost in gas evolution. The solid was filtered, washed with acetone to remove ethylene sulfite and dried under vacuum. Analysis of the product showed 17.2 percent sulfur and 7.85 percent inorganic sulfite as $SO_3$. This indicated a conversion of 75 percent and a yield of sodium isethionate of 87 percent.

Example 5

A quantity of 42 g. (0.5 mole) of sodium bicarbonate and 108 g. (1 mole) of ethylene sulfite was heated together at 169° C. for one-half hour with stirring under a reflux condenser. A white solid product was formed while 25 g. was lost in gas evolution. The solid was filtered, washed with acetone to remove ethylene sulfite and dried under vacuum. Analysis of the product showed 21.5 percent sulfur and 10.8 percent inorganic sulfite as $SO_3$. This indicated a conversion of 94 percent and a yield of sodium isethionate of 85 percent.

What is claimed is:

1. A method for preparing an alkali metal salt of isethionic acid which method comprises reacting at a temperature between 90° and 170° C. at least an equimolar proportion of ethylene sulfite with an alkaline compound of the group consisting of alkali metal carbonates and bicarbonates for a time sufficient to form an alkali metal isethionate.

2. The process as claimed in claim 1 wherein the reaction is carried out in aqueous solution.

3. The process as claimed in claim 1 wherein the reaction is carried out in an inert liquid organic medium.

4. The process as claimed in claim 1 wherein equimolar proportions of ethylene sulfite and sodium bicarbonate are reacted at about 150° C. for about two hours.

References Cited in the file of this patent

Beilstein: Band IV, pp. 13–14.
Brewster: Organic Chemistry, 2nd. ed. (1953), p. 527 relied on.